United States Patent
Daboussi (10) Patent No.: US 8,796,978 B2
(45) Date of Patent: Aug. 5, 2014

(54) PREDICTIVE PULSE WIDTH MODULATION FOR AN OPEN DELTA H-BRIDGE DRIVEN HIGH EFFICIENCY IRONLESS PERMANENT MAGNET MACHINE

(75) Inventor: Zaher Abdallah Daboussi, Abu Dhabi (AE)

(73) Assignee: AeroVironment, Inc., Monrovia, CA (US)

(*) Notice: Subject to any disclaimer, the term of this patent is extended or adjusted under 35 U.S.C. 154(b) by 52 days.

(21) Appl. No.: 13/460,976

(22) Filed: May 1, 2012

(65) Prior Publication Data
US 2012/0326651 A1 Dec. 27, 2012

Related U.S. Application Data

(63) Continuation of application No. 12/565,727, filed on Sep. 23, 2009, now Pat. No. 8,242,731.

(60) Provisional application No. 61/194,102, filed on Sep. 23, 2008.

(51) Int. Cl.
*G05B 11/28* (2006.01)

(52) U.S. Cl.
USPC ........... 318/599; 318/811; 388/811; 388/819; 700/296

(58) Field of Classification Search
USPC .................. 318/599, 811; 388/804, 811, 819; 363/41, 71; 347/144; 700/296
See application file for complete search history.

(56) References Cited

U.S. PATENT DOCUMENTS

| 5,313,148 | A | 5/1994 | Sears et al. | |
|---|---|---|---|---|
| 5,365,153 | A | 11/1994 | Fujita et al. | |
| 5,428,522 | A * | 6/1995 | Millner et al. | 363/63 |
| 5,977,737 | A * | 11/1999 | Labriola, II | 318/599 |
| 6,703,803 | B2 | 3/2004 | Ohiwa et al. | |
| 6,703,809 | B2 | 3/2004 | Royak et al. | |
| 7,064,504 | B2 | 6/2006 | Imai et al. | |
| 7,106,024 | B2 | 9/2006 | Harbaugh et al. | |
| 7,193,383 | B2 | 3/2007 | Sarlioglu et al. | |
| 7,202,622 | B2 * | 4/2007 | Eskritt et al. | 318/400.24 |
| 7,208,908 | B2 | 4/2007 | Anghel et al. | |

(Continued)

FOREIGN PATENT DOCUMENTS

| CN | 1473391 A | 2/2004 |
|---|---|---|
| JP | H06-14405 | 1/1994 |
| KR | 10-1244299 | 3/2013 |
| KR | 10-1246049 | 3/2013 |

OTHER PUBLICATIONS

Office Action in Korea Patent Application No. 10-2000-7009295 dated Jun. 26, 2012.

(Continued)

*Primary Examiner* — Antony M Paul
(74) *Attorney, Agent, or Firm* — Nixon Peabody LLP; Eric Aagaard (57) ABSTRACT

Embodiments of the present method and system permit an effective method for determining the optimum selection of pulse width modulation polarity and type including determining machine parameters, inputting the machine parameters into a predicted duty cycle module, determining the optimum polarity of the pulse width modulation for a predicted duty cycle based on a pulse width modulation generation algorithm, and determining the optimum type of the pulse width modulation for a predicted duty cycle based on the pulse width modulation generation algorithm.

3 Claims, 7 Drawing Sheets

(56) References Cited

U.S. PATENT DOCUMENTS

| | | | |
|---|---|---|---|
| 7,230,837 B1 | 6/2007 | Huang et al. | |
| 7,245,104 B2 | 7/2007 | Tomigashi et al. | |
| 7,358,696 B2 | 4/2008 | Iwanaga et al. | |
| 7,525,269 B2 | 4/2009 | Patel et al. | |
| 7,652,441 B2 | 1/2010 | Ying Yin Ho | |
| 7,772,725 B2 * | 8/2010 | Siman-Tov | 307/140 |
| 8,031,495 B2 * | 10/2011 | Sachdeva et al. | 363/71 |
| 8,242,720 B2 | 8/2012 | Daboussi et al. | |
| 8,242,731 B2 | 8/2012 | Daboussi et al. | |
| 2004/0100216 A1 * | 5/2004 | Makaran et al. | 318/434 |
| 2005/0225275 A1 | 10/2005 | Eskritt et al. | |
| 2006/0006829 A1 | 1/2006 | Anghel | |
| 2007/0001635 A1 | 1/2007 | Ho | |
| 2007/0040528 A1 | 2/2007 | Tomigashi et al. | |
| 2007/0132415 A1 | 6/2007 | Patel et al. | |
| 2010/0188033 A1 | 7/2010 | Daboussi et al. | |
| 2012/0326639 A1 | 12/2012 | Daboussi et al. | |

OTHER PUBLICATIONS

Notice of Allowance in Korea Patent Application No. 10-2000-7009295 dated Dec. 20, 2012.
Office Action in U.S. Appl. No. 12/565,741 dated Jan. 17, 2012.
Search Report in Chinese Application No. 200980146650.4, dated Mar. 13, 2013.
Office Action in Chinese Application No. 200980146650.4, dated Mar. 22, 2013.
Office Action in Japanese Application No. 2011-528095, dated Apr. 18, 2013.
Search and Examination Report in Singapore Patent Application No. 201102802-4, mailed Aug. 22, 2012.
Search and Examination Report in Singapore Patent Application No. 201102800-8, mailed Aug. 22, 2012.
Office Action in Korea Patent Application No. 10-2011-7009295 dated Jun. 26, 2012.
Notice of Allowance in Korea Patent Application No. 10-2011-7009295 dated Dec. 20, 2012.
Prokop, L. et al., "3-phase BLDC Motor Control with Sensorless Back-EMF ADC Zero Crossing Detection Using 56F80x, Design of Motor Control Application Based on the Software Development Kit SDK," Freescale Semiconductor, Application Note AN 1913, Rev. 3, Nov. 2005, 60 pages.
International Search Report in PCT Application No. PCT/US2009/058117, mailed Nov. 24, 2009.
International Search Report in PCT Application No. PCT/US2009/058119, mailed Nov. 20, 2009.
Search Report and Written Opinion in Singapore Patent Application No. 201102802-4, mailed Dec. 2, 2011.
Office Action in U.S. Appl. No. 12/565,727, mailed Jan. 6, 2012.
Search Report and Written Opinion in Singapore Patent Application No. 201102800-8, mailed Dec. 2, 2011.
Office Action in CA Application No. 2,740,401, dated Jan. 23, 2013.
Office Action in AU Application No. 2009296685, dated Jan. 2, 2013.
Office Action in CA Application No. 2,740,404, dated Jan. 29, 2013.
Office Action in U.S. Appl. No. 13/547,453, dated Mar. 19, 2013.
Japanese Office Action in Japanese Application No. 2011-528095, mailed on Apr. 23, 2013.
Office Action in Chinese Application No. 200980146648.7, mailed on May 31, 2013.
Second Examination Report for Australian Patent Application No. 2009296683, mailed on Sep. 12, 2013.
Australian Patent Examination Report No. 1 in Australian Application No. 2009296683 mailed on Mar. 1, 2013.
Japanese Office Action in Japanese Application No. 2011-528096 mailed on Apr. 23, 2013.
Korean Office Action in Korean Patent Application No. 10-2011-7008982 mailed on Jun. 26, 2012.
Notice of Allowance in U.S. Appl. No. 12/565,741 dated Apr. 27, 2012.
Notice of Allowance in U.S. Appl. No. 12/565,727 dated Apr. 19, 2012.
Notice of Allowance in U.S. Appl. No. 13/547,453 dated Jul. 12, 2013.

* cited by examiner

PREDICTIVE PULSE WIDTH MODULATION FOR AN OPEN DELTA H-BRIDGE DRIVEN HIGH EFFICIENCY IRONLESS PERMANENT MAGNET MACHINE

CLAIM OF BENEFIT AND INCORPORATION BY REFERENCE

This application is a continuation of U.S. patent application Ser. No. 12/565,727, entitled "PREDICTIVE PULSE WIDTH MODULATION FOR AN OPEN DELTA H-BRIDGE DRIVEN HIGH EFFICIENCY IRONLESS PERMANENT MAGNET MACHINE", filed Sep. 23, 2009, which claims priority to U.S. Provisional Patent Application No. 61/194,102 to DABOUSSI., filed Sep. 23, 2008, entitled "PREDICTIVE PWM FOR OPEN DELTA H-BRIDGE DRIVE HIGH EFFICIENCY IRONLESS P.H. METER", the entire disclosure of which is incorporated by reference herein.

TECHNICAL FIELD

This disclosure relates to a method and system that makes use of the availability of the machine parameters required to achieve optimal selection of pulse width modulation polarity and type. More specifically, the disclosure relates to a method and system that uses a predictive duty cycle employing machine parameters to determine both the magnitude and the pulse width of the pulse width modulation that is required to generate a waveform at a given operation condition, as well as the polarity of the pulse width modulation.

BACKGROUND

A permanent magnet machine is a type of alternating current (AC) motor whereby power is supplied to the rotating device by means of imposing an electromagnetic field onto a field generated by a permanent magnet rotor. To control an AC permanent magnet machine, the absolute position of the magnetic field produced by the rotor permanent magnets (PM) needs to be known at all times. The magnet's position is important for determining the stator current magnitude of the machine necessary to produce the desired torque. This operation is known as the stator current commutation. Since magnets are rotating with respect to the stator, the magnet position can be calculated by measuring the rotor absolute angular position. Absolute position sensors such as resolvers and optical encoders are typically used to measure the absolute angular position of the machine rotor.

Figure 1A:
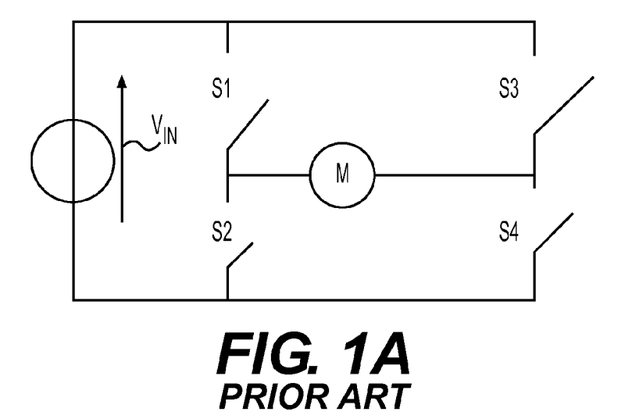
FIG. 1A is a schematic representation of the general structure of an H-bridge.
Figure 1B:
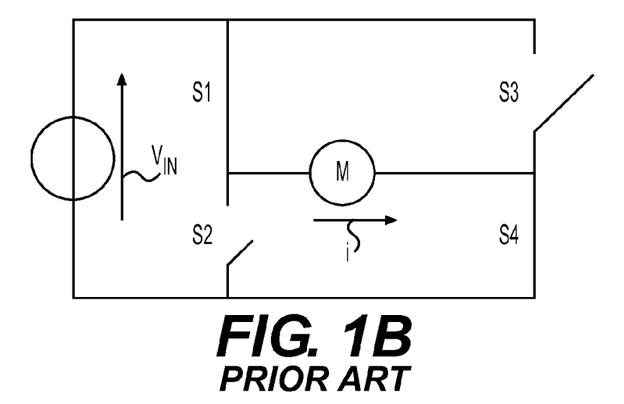
FIG. 1B is a schematic representation of an H-bridge in one basic state.
Figure 1C:
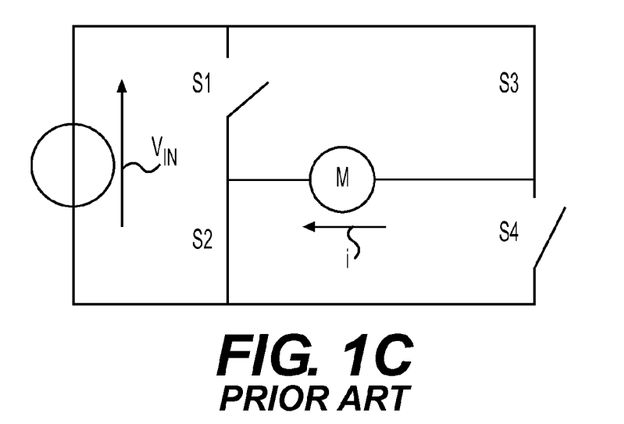
FIG. 1C is schematic representation of an H-bridge in another basic state.

H-bridge topologies are commonly used to drive open delta permanent magnet machines, as well as other types of machines. An H-bridge is an electronic circuit which enables a voltage to be applied across a load in either direction. The term "H-bridge" is derived from the typical graphical representation of such a circuit as seen in FIG. 1A. An H-bridge is built with four switches, which may be solid-state or mechanical. As seen in FIG. 1B, when switches S1 and S4 are closed, and switches S2 and S3 are open, a positive voltage will be applied across the motor. However, by opening switches S1 and S4, and closing switches S2 and S3 (FIG. 1C), this voltage is reversed allowing reverse operation of the motor. An H-bridge arrangement may be used to reverse the polarity of the motor, but may also be used to stop the motor if the motor's terminals are shorted.

One of the main benefits for using an H-bridge to drive a PM machine is that it lowers the ripple current in the motor windings that results from the pulsating voltage waveforms of the pulse modulated power stage. Ripple current is a small unwanted residual periodic variation of the direct current output of a power supply which has been derived from an alternating power source. Another benefit garnered from driving a PM machine with an H-bridge is that the H-bridge allows a greater level of flexibility to shape the current waveform beyond the 120-degree limitation imposed by a conventional 3-phase inverter.

To properly control the currents and to minimize the harmonic content in the current waveforms, robust control must be performed. One of the issues with H-bridge control is that in order to reduce the machine ripple current, unipolar pulse width modulation (PWM) must be employed. With unipolar PWM, a 50% reduction in ripple current is achieved when compared to bipolar PWM. When using unipolar PWM during transition periods where the machine emf voltage has a different polarity from the terminal voltage, a combination of unipolar and bipolar PWM must be employed; otherwise, current distortion will result. The existing prior art merely selects unipolar verses bipolar PWM based upon the sign of the current waveform. This conventional approach leads to additional harmonics in the current waveform that will lead to increased heating in the machine.

SUMMARY

The present method and system optimizes the pulse width modulation generation by appropriately determining when unipolar or bipolar PWM should be used, by exploiting the machine temperature measurements, machine parameters, operation conditions, and the dynamic model of the machine windings.

Embodiments of the present disclosure relate to a computer-implemented method for determining a predictive duty cycle that is able to determine the magnitude and pulse width of an H-bridge pulse width modulation that is used to drive a machine motor, including determining machine parameters, inputting the machine parameters into a predicted duty cycle module, determining the optimum polarity of the pulse width modulation for a predicted duty cycle based on a pulse width modulation generation algorithm, and determining the optimum type of the pulse width modulation for a predicted duty cycle based on the pulse width modulation generation algorithm.

The embodiments of the present disclosure relate to a system for determining a predictive duty cycle that is able to determine the magnitude and pulse width of an H-bridge pulse width modulation that is used to drive a machine motor, including means for determining machine parameters, means for inputting the machine parameters into a predicted duty cycle module, means for determining the optimum polarity of the pulse width modulation for a predicted duty cycle based on a pulse width modulation generation algorithm; and means for determining the optimum type of the pulse width modulation for a predicted duty cycle based on the pulse width modulation generation algorithm.

The embodiments of the present disclosure further relate to a computer-readable medium for determining a predictive duty cycle that is able to determine the magnitude and pulse width of an H-bridge pulse width modulation that is used to drive a machine motor, including means for determining machine parameters, means for inputting the machine parameters into a predicted duty cycle module, means for determining the optimum polarity of the pulse width modulation for a predicted duty cycle based on a pulse width modulation generation algorithm; and means for determining the optimum type of the pulse width modulation for a predicted duty cycle based on the pulse width modulation generation algorithm.

The method for determining a predictive duty cycle that is able to determine the magnitude and pulse width of an H-bridge pulse width modulation that is used to drive a machine motor may include that the type of the predicted duty cycle is one of unipolar or bipolar, and the pulse width modulation generation algorithm is $$d_{prediction}(\theta_{elect}) = \frac{\left(E_{emf}(T_{magnet}, rpm) \cdot \sin(\theta_{elect}) + i_{ref}(\theta_{elect})R_s(T_{winding}) + L \cdot \frac{di_{ref}}{dt}\right)}{Vbus}$$

wherein $E_{emf}(T_{magnet}, rpm)$ is the back emf of the machine as a function of the magnet temperature and speed, $\theta_{elect}$ is the electrical angle for the machine during that particular duty cycle, $I_{ref}$ is an input quantity of reference current, i.e., the amount of current that the processor wants to get out of that particular duty cycle, $R_s$ is the phase resistance of the machine and is a known input parameter, $T_{winding}$ is the temperature of the windings in the coil, and is also a known input parameter, L is the inductance of the inductor and is also an input parameter, and Vbus is the supply voltage of the inverter, and is a quantity that is measured by an analog-to-digital converter.

The system for determining a predictive duty cycle that is able to determine the magnitude and pulse width of an H-bridge pulse width modulation that is used to drive a machine motor may further include that the type of the predicted duty cycle is one of unipolar or bipolar, and the pulse width modulation generation algorithm is $$d_{prediction}(\theta_{elect}) = \frac{\left(E_{emf}(T_{magnet}, rpm) \cdot \sin(\theta_{elect}) + i_{ref}(\theta_{elect})R_s(T_{winding}) + L \cdot \frac{di_{ref}}{dt}\right)}{Vbus}$$

wherein $E_{emf}(T_{magnet}, rpm)$ is the back emf of the machine as a function of the magnet temperature and speed, $\theta_{elect}$ is the electrical angle for the machine during that particular duty cycle, $I_{ref}$ is an input quantity of reference current, i.e., the amount of current that the processor wants to get out of that particular duty cycle, $R_s$ is the phase resistance of the machine and is a known input parameter, $T_{winding}$ is the temperature of the windings in the coil, and is also a known input parameter, L is the inductance of the inductor and is also an input parameter, and Vbus is the supply voltage of the inverter, and is a quantity that is measured by an analog-to-digital converter.

The computer-readable medium for determining a predictive duty cycle that is able to determine the magnitude and pulse width of an H-bridge pulse width modulation that is used to drive a machine motor may further include that the type of the predicted duty cycle is one of unipolar or bipolar, and the pulse width modulation generation algorithm is $$d_{prediction}(\theta_{elect}) = \frac{\left(E_{emf}(T_{magnet}, rpm) \cdot \sin(\theta_{elect}) + i_{ref}(\theta_{elect})R_s(T_{winding}) + L \cdot \frac{di_{ref}}{dt}\right)}{Vbus}$$

wherein $E_{emf}(T_{magnet}, rpm)$ is the back emf of the machine as a function of the magnet temperature and speed, $\theta_{elect}$ is the electrical angle for the machine during that particular duty cycle, $I_{ref}$ is an input quantity of reference current, i.e., the amount of current that the processor wants to get out of that particular duty cycle, $R_s$ is the phase resistance of the machine and is a known input parameter, $T_{winding}$ is the temperature of the windings in the coil, and is also a known input parameter, L is the inductance of the inductor and is also an input parameter, and Vbus is the supply voltage of the inverter, and is a quantity that is measured by an analog-to-digital converter.

BRIEF DESCRIPTION OF THE DRAWINGS

The disclosure is described through a preferred embodiment and the attached drawings in which.

DETAILED DESCRIPTION

Applicants have discovered a method and system to optimize the pulse width modulation generation by appropriately determining when a unipolar verses a bipolar pulse width modulation should be used. Moreover, the present method and system uses a predictive method to determine when bipolar verses unipolar PWM should be used, and this prediction is based on factors such as machine temperature measurements, machine parameters, operation conditions, and the dynamic model of the machine windings.

Figure 2:
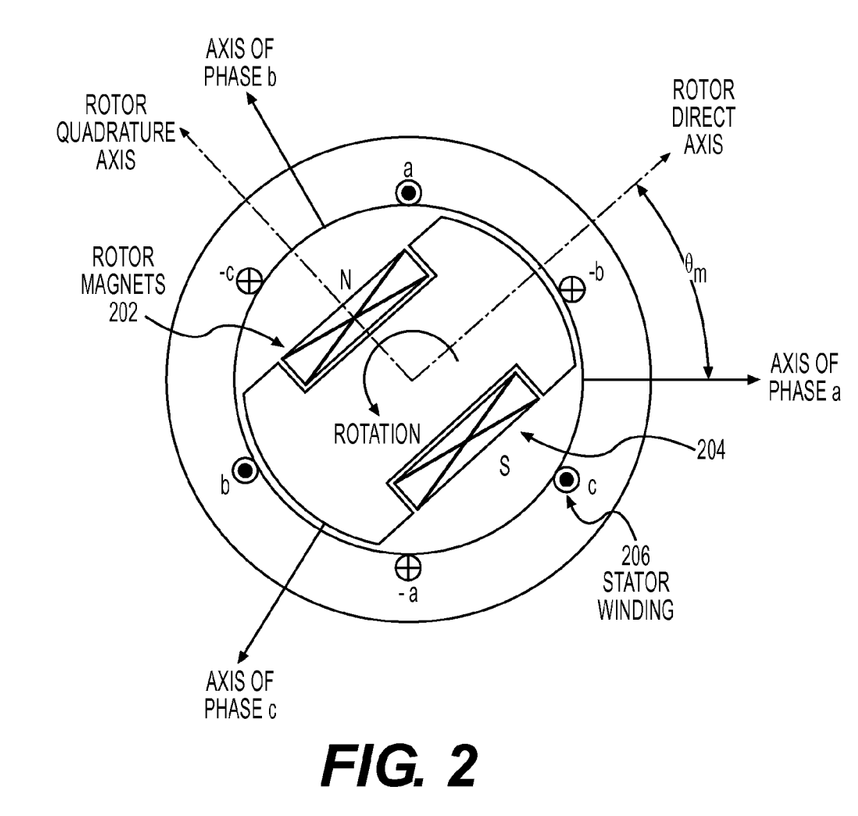
FIG. 2 is a schematic representation of the magnets used in the motor in accordance with one embodiment of the present disclosure.

A preferred embodiment of the motor/generator used in the present method and system is illustrated in FIG. 2. The motor/generator of the present method and system includes, among other things, ironless rotor magnets 202, 204, as well as a stator 206.

Figure 3:
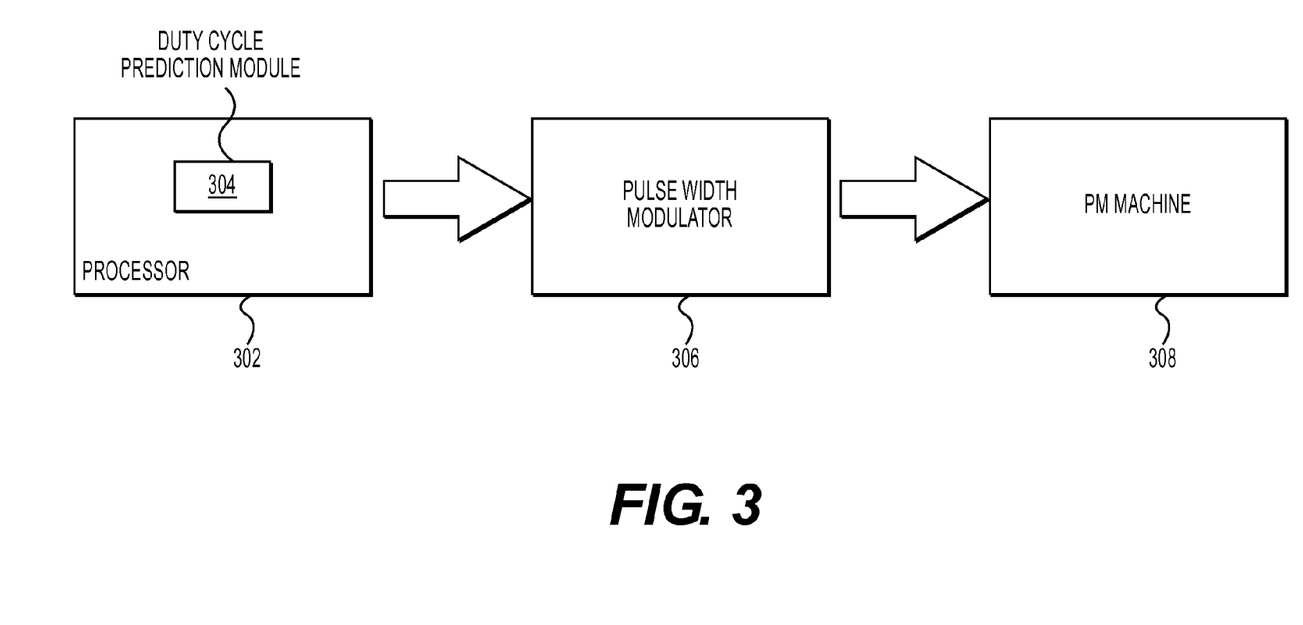
FIG. 3 is a block diagram of the arrangement of the system in one embodiment of the present invention.

FIG. 3 illustrates a block diagram of one embodiment of the present invention, including a processor 302 with a duty cycle prediction module 304 which sends information to a pulse width modulator 306. The pulse width modulator 306 switches the pulse for a permanent magnet machine 308.

Figure 4:
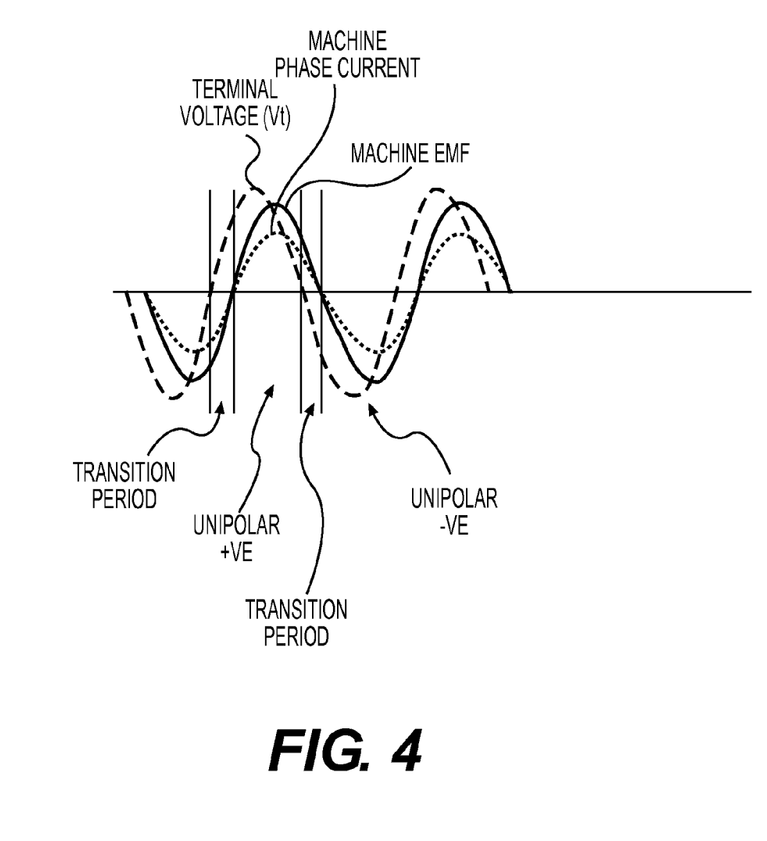
FIG. 4 is a graphical representation of the of a duty cycle with respect to one embodiment of the present disclosure.

FIG. 4 illustrates a graphical representation of a duty cycle with respect to one embodiment of the present method and system. FIG. 4 depicts, by way of example, when a duty cycle is unipolar and how the machine and processor determines when unipolar positive pulses verses unipolar negative pulses are used in the duty cycle. This graphical representation also shows the transition periods when the machine emf voltage has a different polarity from the terminal voltage, and a combination of unipolar and bipolar pulse width modulation must be should be applied to avoid current distortion.

Figure 5A:
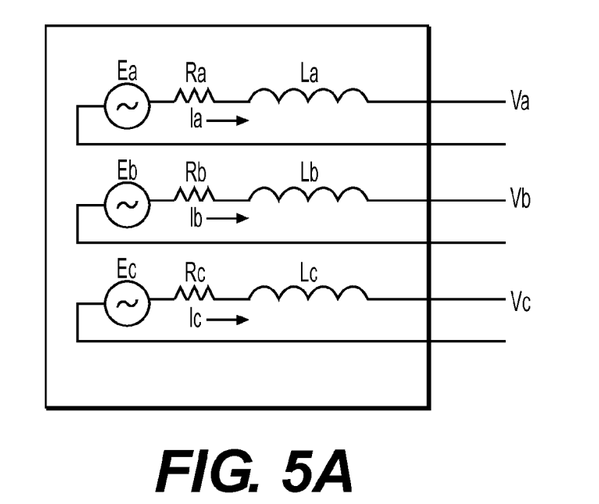
FIG. 5A is a schematic diagram of a 3-phase open delta machine model.

FIG. 5A illustrates a 3-phase open delta configuration machine model that includes schematic representations for three power sources $E_a$, $E_b$, and $E_c$, three resistors $R_a$, $R_b$, and $R_c$, and three inductors $L_a$, $L_b$, and $L_c$, although other configurations are contemplated. The currents $i_a$, $i_b$, and $i_c$ of each of the phases are also depicted in the machine model seen in FIG. 5A. The machine model is considered an open delta configuration since the three windings are not all connected to one point. The machine is able to receive digital-signals which dictate the motor's movement. For instance, in the case of a permanent magnet machine, the motor is started spinning by the motor setting the current vector to a very high DC magnitude. Setting the current vector to a high constant value enables the magnetic field vector of the motor to align itself with the current vector. At this initial time, the torque angle of the motor is near zero.

Figure 5B:
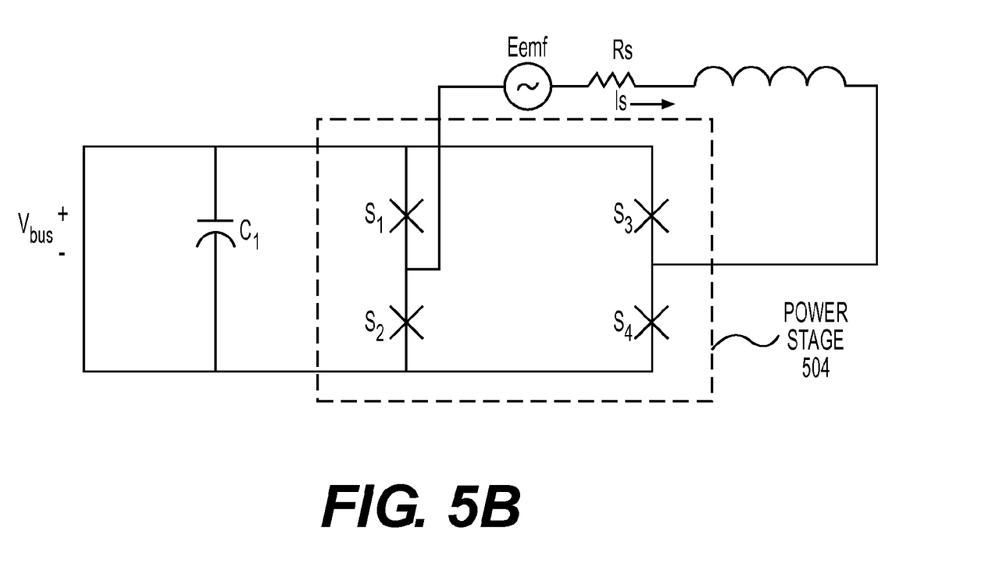
FIG. 5B is an expanded view of a terminal of the machine.

FIG. 5B is an expanded view of a terminal of the machine, depicting a terminal being driven by an H-bridge at a power stage 504. The power stage 504 includes the four switches $S_1$, $S_2$, $S_3$, $S_4$ of the H-bridge. Thus, the machine is said to have 6-switching poles since the motor has 3 phases. FIG. 4B also depicts the supply voltage Vbus and a capacitor C.

Figure 6:
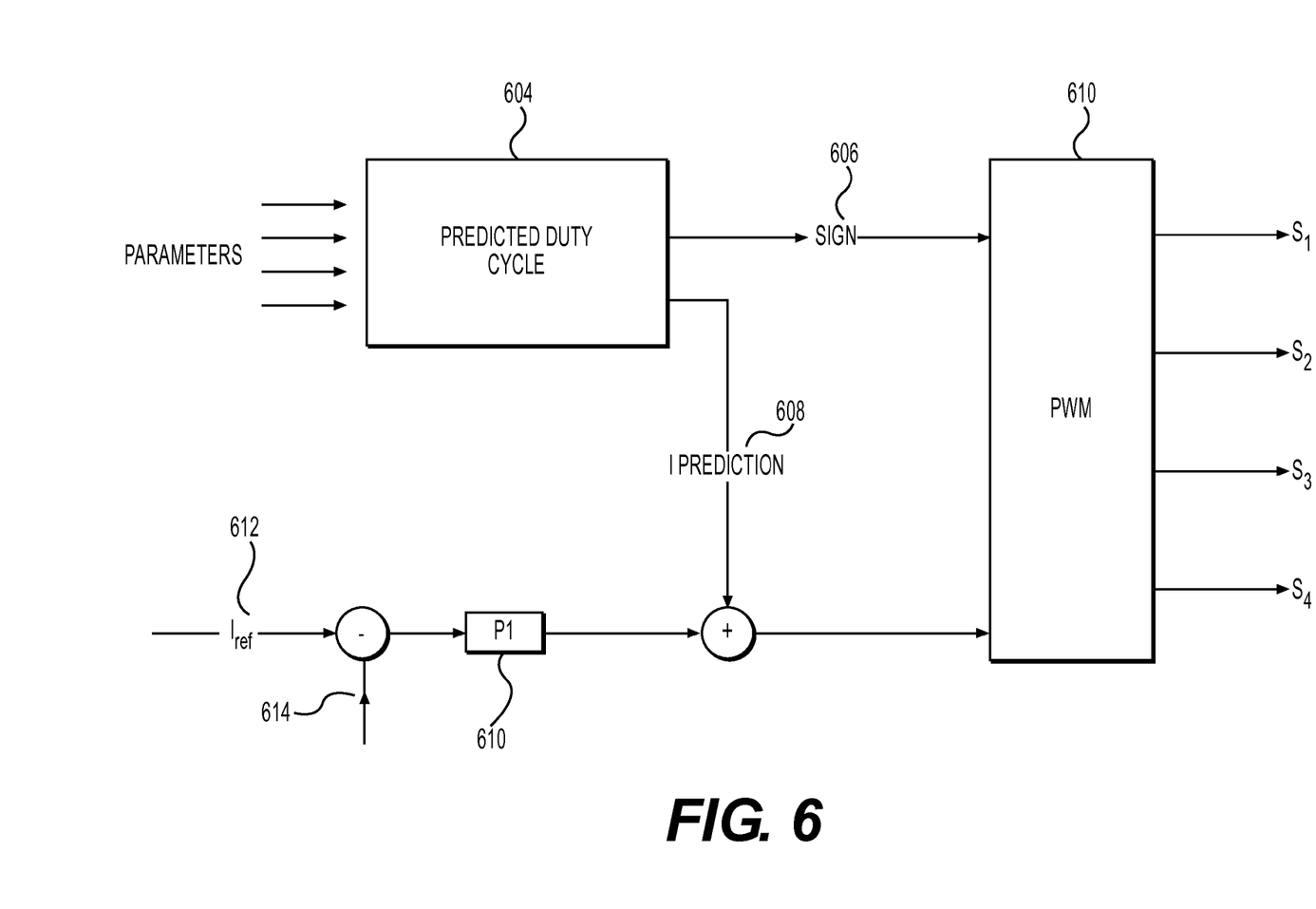
FIG. 6 is a block diagram for determining the sign and type of the predicted duty cycle.

FIG. 6 depicts a flow diagram for determining which of the switching poles needs to be switched based on the sign and polarity of the of duty cycle. This is accomplished by a processor by solving the algorithm:

$$d_{prediction}(\theta_{elect}) = \frac{\left(E_{emf}(T_{magnet}, rpm) \cdot \sin(\theta_{elect}) + i_{ref}(\theta_{elect})R_s(T_{winding}) + L \cdot \frac{d\,i_{ref}}{dt}\right)}{Vbus}.$$

Where:

$E_{emf}(T_{magnet},rpm)$ is the back emf of the machine as a function of the magnet temperature and speed;

$\theta_{elect}$ is the electrical angle for the machine during that particular duty cycle;

$I_{ref}$ is an input quantity of reference current, i.e., the amount of current that the processor wants to get out of that particular duty cycle;

$R_s$ is the phase resistance of the machine and is a known input parameter;

$T_{winding}$ is the temperature of the windings in the coil, and is also a known input parameter;

L is the inductance of the inductor and is also an input parameter; and

Vbus is the supply voltage of the inverter, and is a quantity that is measured by an analog-to-digital converter. Some or all of the input parameters/quantities do not have to be measured during the operation of the machine, but rather can be known prior to operation. Parameters that are unknown prior to the operation of the machine may be measured during operation.

The sign (+or −) of the output of the algorithm, $d_{predictive}$, delineated above will determine which of the switching poles needs to be switched. When $d_{predictive}$ is a positive value then the pulse width modulation is unipolar positive, thus switching S1 and S2 on while maintaining S4 on and S3 off will drive a current in the positive direction. When $d_{predictive}$ is a negative value, the pulse width modulation is unipolar negative, thus switching S3 and S4 on while maintaining S2 on and S1 off will drive a current in the negative direction.

As illustrated in FIG. 6, once the processor inputs parameters 602 into the predictive duty cycle 604, the algorithm is able to determine the sign 606 of the predictive duty cycle, as well as the value of $d_{predicitive}$ 608, which determines the polarity of the duty cycle. Moreover, the processor determines a predicted duty cycle such that the PI regulator 610 is limited in the amount of current correction that it implements, i.e., such that the actual current 614 in the motor is close to the reference current 612 that the processor wants to get out of that particular duty cycle. This reduces the ripple current of the machine and consequently the machine motor runs more efficiently.

Figure 7:
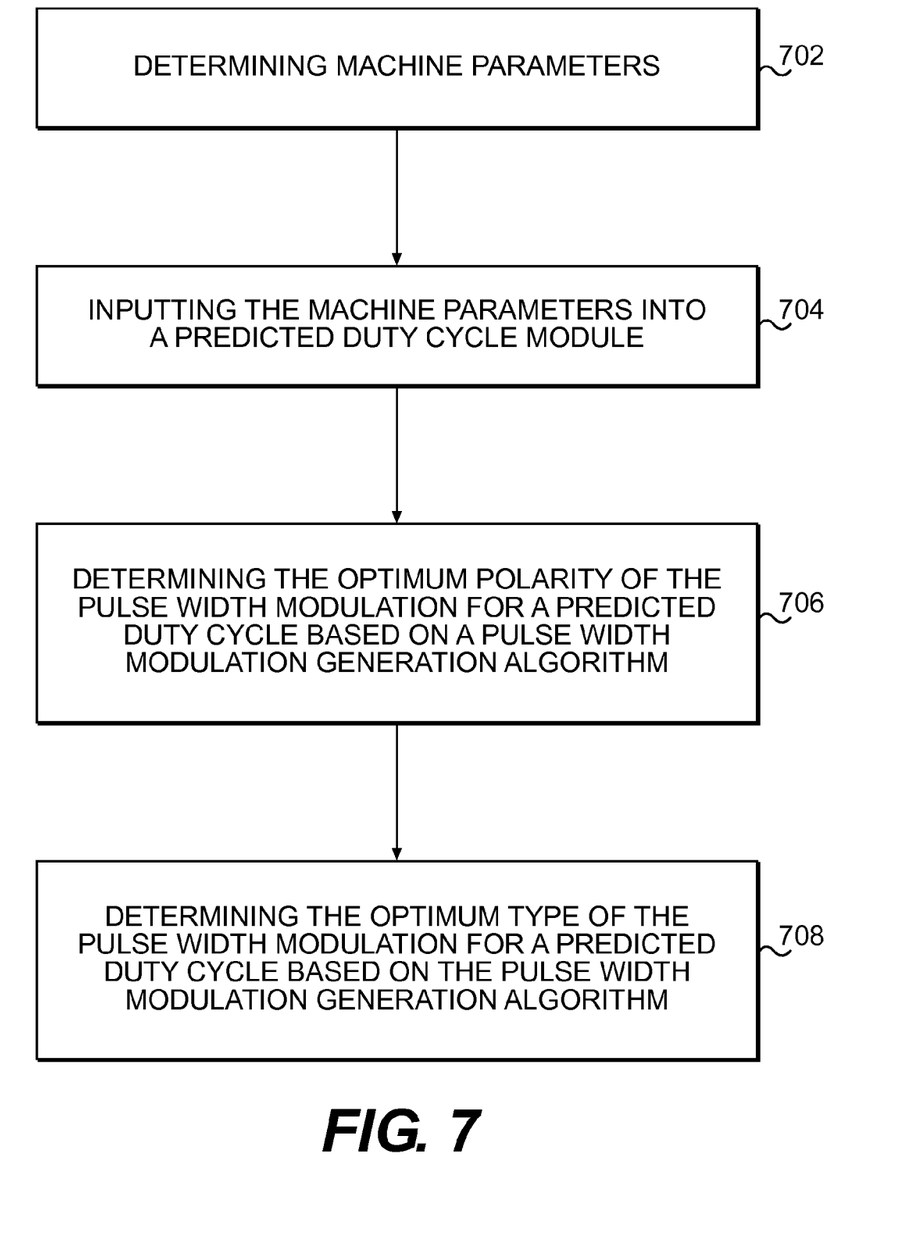
FIG. 7 is a flowchart for determining the optimum pulse width modulation for a duty cycle.

FIG. 7 illustrates a flowchart for optimizing the torque of a permanent magnet machine in one embodiment of the present method and system. In step 702, machine parameters are determined. These parameters may be values known prior to the operation of the machine, and/or they may be parameters that are measured during the operation of the machine. Next, in step 704, the machine parameters are input into a duty cycle prediction module. Then, the optimum polarity of the pulse width modulation is determined for a predicted duty cycle based on a pulse width modulation generation algorithm, which is the equation described above, in step 706. Finally, in step 708, the optimum type of pulse width modulation is determined for a predicted duty cycle based on a pulse width modulation generation algorithm.

Although, the above recited method and system is described for implementation in a permanent magnet machine, this system, method, and computer-readable medium could be used in any type of motor that has a back emf that is proportional to speed.

Thus, the above described method, system, and computer-readable medium in accordance with the embodiments of the present method and system, as can now be fully appreciated, provides a very effective method for determining the optimum selection of pulse width modulation polarity and type.

The method and system has been described through a preferred embodiment. However, various modifications can be made without departing from the scope of the method and system as defined by the appended claims and legal equivalents.

What is claimed:

1. A method for determining a predictive duty cycle that is able to determine the magnitude and pulse width of an H-bridge pulse width modulation that is used to drive a machine motor, comprising:
   determining one or more machine parameters;
   inputting the machine parameters into a predicted duty cycle module;
   determining the optimum polarity, selected from a negative polarity or a positive polarity, of the pulse width modulation for a predicted duty cycle based on a pulse width modulation generation algorithm; and
   determining, during a transition period in which machine emf voltage has a different polarity from a terminal voltage, whether the pulse width modulation is unipolar or bipolar for a predicted duty cycle based on the pulse width modulation generation algorithm.

2. A system for determining a predictive duty cycle that is able to determine the magnitude and pulse width of an H-bridge pulse width modulation that is used to drive a machine motor, comprising:
   means for determining one or more machine parameters;
   means for inputting the machine parameters into a predicted duty cycle module;
   means for determining the optimum polarity, selected from a negative polarity or a positive polarity, of the pulse width modulation for a predicted duty cycle based on a pulse width modulation generation algorithm; and
   means for determining, during a transition period in which machine emf voltage has a different polarity from a terminal voltage, whether the pulse width modulation is unipolar or bipolar for a predicted duty cycle based on the pulse width modulation generation algorithm.

3. A non-transitory computer-readable medium for determining a predictive duty cycle that is able to determine the magnitude and pulse width of an H-bridge pulse width modulation that is used to drive a machine motor, comprising:

means for determining one or more machine parameters;

means for inputting the machine parameters into a predicted duty cycle module; and means for determining the optimum polarity, selected from a negative polarity or a positive polarity, of the pulse width modulation for a predicted duty cycle based on a pulse width modulation generation algorithm; and means for determining, during a transition period in which machine emf voltage has a different polarity from a terminal voltage, whether the pulse width modulation is unipolar or bipolar for a predicted duty cycle based on the pulse width modulation generation algorithm.

\* \* \* \* \*